(12) United States Patent
Lin

(10) Patent No.: US 9,671,029 B2
(45) Date of Patent: Jun. 6, 2017

(54) LID OF GAS PRESSURE REGULATOR

(71) Applicant: Te-Feng Lin, Taipei (TW)

(72) Inventor: Te-Feng Lin, Taipei (TW)

( * ) Notice: Subject to any disclaimer, the term of this patent is extended or adjusted under 35 U.S.C. 154(b) by 0 days.

(21) Appl. No.: 14/866,876

(22) Filed: Sep. 26, 2015

(65) Prior Publication Data

US 2017/0089480 A1    Mar. 30, 2017

(51) Int. Cl.
*F16K 27/12*    (2006.01)
*B65D 41/10*    (2006.01)
*G05D 16/06*    (2006.01)

(52) U.S. Cl.
CPC ........... *F16K 27/12* (2013.01); *B65D 41/10* (2013.01); *G05D 16/0636* (2013.01); *Y10T 137/7822* (2015.04)

(58) Field of Classification Search
CPC ............ B65D 41/10; B65D 41/12; Y10T 137/7793–137/7831; G05D 16/063; G05D 16/0633; G05D 16/0636
USPC .... 220/309.1, 309.2, 310.1; 137/505–505.47
See application file for complete search history.

(56) References Cited

U.S. PATENT DOCUMENTS

| | | | | |
|---|---|---|---|---|
| 1,431,218 A | * | 10/1922 | Cooke ................... | B65D 41/12 220/310.1 |
| 1,500,200 A | * | 7/1924 | Overstreet .............. | B65D 7/36 220/309.2 |
| 1,663,775 A | * | 3/1928 | Rollason ................ | B65D 45/16 220/309.2 |
| 1,667,284 A | * | 4/1928 | Chamberlain ......... | B65D 45/16 220/309.2 |
| 1,755,297 A | * | 4/1930 | Hildebrandt ............ | B65D 7/34 220/309.2 |
| 2,191,705 A | * | 2/1940 | Chamberlain ......... | B65D 15/06 220/309.2 |
| 2,243,754 A | * | 5/1941 | Honegger .............. | B65D 47/00 220/266 |
| 2,280,088 A | * | 4/1942 | Honegger ............... | F17C 13/06 220/265 |
| 2,338,013 A | * | 12/1943 | Schrader ............ | B65D 43/0233 220/284 |
| 2,583,873 A | * | 1/1952 | Nichols .................. | B65D 53/02 220/260 |
| 2,737,201 A | * | 3/1956 | St Clair ............. | G05D 16/0655 137/505.41 |
| 2,737,202 A | * | 3/1956 | Baldwin, Jr. ...... | G05D 16/0655 137/505.41 |
| 3,084,826 A | * | 4/1963 | Ericson .................. | B21D 51/38 220/309.1 |
| 3,302,534 A | * | 2/1967 | Bauer ...................... | F02D 9/00 251/61 |

(Continued)

*Primary Examiner* — William McCalister
(74) *Attorney, Agent, or Firm* — Shimokaji IP

(57) ABSTRACT

A lid of gas pressure regulator has a top segment, a surrounding wall, a pressing segment, and a gap. The surrounding wall protrudes downward and annularly from an annular edge of the top segment. The pressing segment protrudes transversely, outward and annularly from a bottom edge of the surrounding wall, and extends upward. The gap is formed between the surrounding wall and the pressing segment. Because the pressing segment is thinned and the gap is formed between the pressing segment and the surrounding wall, the overall volume and the weight can be reduced, and the pressing segment has sufficient height to prevent an opening edge of the seat from being bent at a large angle and fracture.

6 Claims, 6 Drawing Sheets

(56) References Cited

U.S. PATENT DOCUMENTS

| | | | | |
|---|---|---|---|---|
| 3,664,369 | A * | 5/1972 | Johnson | G05D 16/0641 137/484.4 |
| 3,792,717 | A * | 2/1974 | Tibbals, Jr. | F16K 31/365 137/505.25 |
| 3,921,850 | A * | 11/1975 | Powers | B65D 7/42 220/310.1 |
| 4,204,561 | A * | 5/1980 | Ludwig | F02M 69/54 137/510 |
| 4,513,872 | A * | 4/1985 | Bull | B21D 51/2646 220/310.1 |
| 4,635,537 | A * | 1/1987 | Field | F02M 69/54 137/510 |
| 4,653,528 | A * | 3/1987 | Field | F02M 69/462 123/468 |
| 4,741,360 | A * | 5/1988 | Affeldt | F02M 69/54 137/510 |
| 5,052,577 | A * | 10/1991 | Cuns-Rial | B65D 83/38 215/327 |
| 5,579,944 | A * | 12/1996 | Hafner | B65D 83/38 215/347 |
| 5,881,765 | A * | 3/1999 | Turney | G05D 16/0658 137/484.4 |
| 5,996,617 | A * | 12/1999 | Olds | G05D 16/0602 137/505.12 |
| 6,289,925 | B1 * | 9/2001 | Miyazoe | G05D 16/0661 137/505.41 |
| 6,648,164 | B1 * | 11/2003 | DeCola | B65D 43/0233 220/309.1 |
| 6,672,331 | B2 * | 1/2004 | Heald | F16K 27/12 137/315.05 |
| 6,722,519 | B2 * | 4/2004 | Baughman | B65D 7/40 220/254.8 |
| 7,628,068 | B2 * | 12/2009 | Bessette | G01D 11/24 220/200 |
| 8,496,131 | B2 * | 7/2013 | Forrest | B65D 1/0246 215/317 |
| 8,579,150 | B2 * | 11/2013 | Janny | B65D 43/0212 220/310.1 |
| 2006/0006180 | A1 * | 1/2006 | Chen | B65D 81/2053 220/310.1 |
| 2007/0151606 | A1 * | 7/2007 | Querejeta | G05D 16/0655 137/505.36 |
| 2011/0011866 | A1 * | 1/2011 | Dunwoody | B65D 41/02 220/310.1 |
| 2012/0241457 | A1 * | 9/2012 | Hallman | B65D 83/38 220/309.1 |

* cited by examiner

LID OF GAS PRESSURE REGULATOR

BACKGROUND OF THE INVENTION

1. Field of the Invention

The present invention relates to a lid of gas pressure regulator.

2. Description of the Prior Arts

A gas pressure regulator is mounted on a pipe of a gas tank to adjust the output gas pressure. The conventional gas pressure regulator has a seat, a lid, a sealing washer and some adjusting components. With reference to FIG. 6, to assemble the seat 91 and the lid 92, the sealing washer 93 is mounted inside a top opening edge 911 of the seat 91. Then, the lid 92 is mounted in the top opening of the seat 91. A pressing segment 921 is annularly and transversely formed on a bottom opening of the lid 92, is disposed inside the opening edge 911 of the seat 91, and abuts downward the sealing washer 93. Then, the opening edge 911 of the seat 91 is pounded inward to be bent to press the pressing segment 921 of the lid 92, such that the lid 92 tightly abuts downward the sealing washer 93 to securely assemble the seat 91 and the lid 92.

During the above process, if the pressing segment 921 is too thin, the opening edge 911 of the seat 91 has to be bent at a larger angle to press and abut the pressing segment 921. However, a too-large bending angle of the opening edge 911 of the seat 91 may result in the fracture thereof. Further, the conventional lid is formed by casting, which hinders precise adjustment of a detailed shape of the pressing segment 921. Thus, the pressing segment 921 can only be formed in a round-protrusion-shape, which may cause the waste of material, and the lid can hardly be made lightweight.

To overcome the shortcomings, the present invention provides a lid of gas pressure regulator to mitigate or obviate the aforementioned problems.

SUMMARY OF THE INVENTION

The main objective of the present invention is to provide a lid of gas pressure regulator with thinned pressing segment and a gap between the pressing segment and the surrounding wall.

The lid of gas pressure regulator has a top segment, a surrounding wall, a pressing segment, and a gap. The surrounding wall protrudes downward and annularly from an annular edge of the top segment. The pressing segment protrudes transversely, outward and annularly from a bottom edge of the surrounding wall, and extends upward. The gap is formed between the surrounding wall and the pressing segment.

Because the pressing segment is thinned and the gap is formed between the pressing segment and the surrounding wall, the overall volume and the weight can be reduced, and the pressing segment has sufficient height to prevent an opening edge of the seat from being bent at a large angle and fracture.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
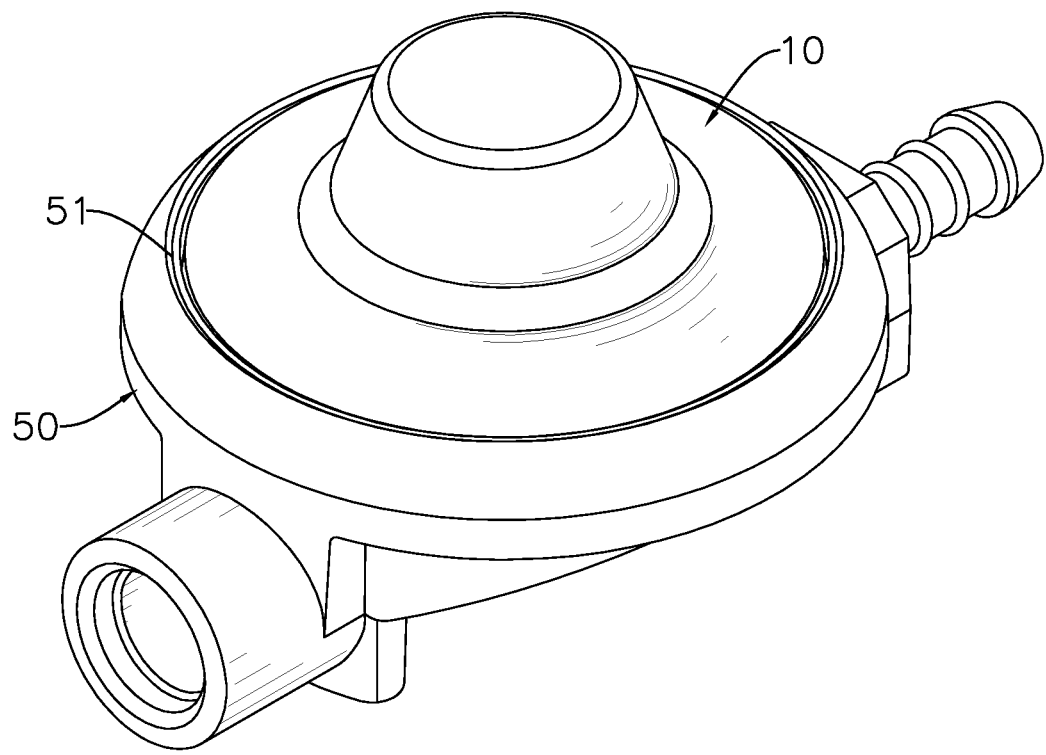
FIG. 1 is a perspective view of a lid of gas pressure regulator in accordance with the present invention, shown assembled with a seat.
Figure 2:
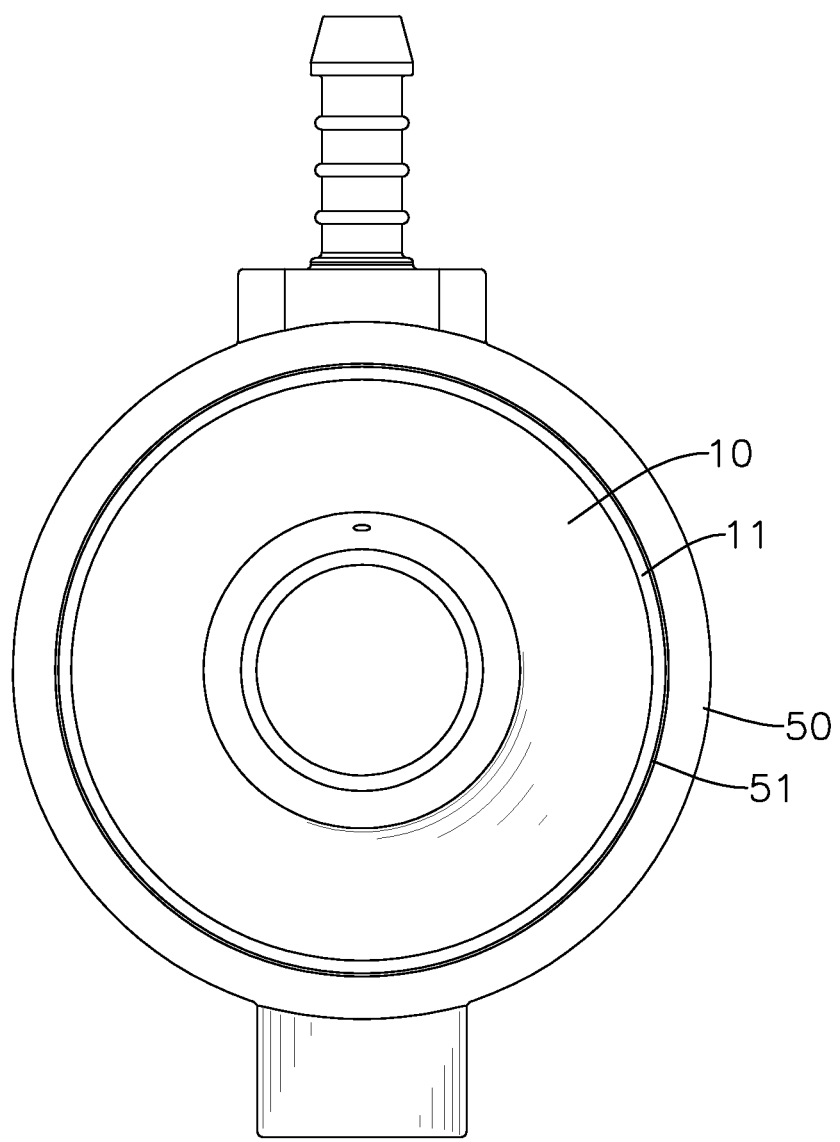
FIG. 2 is a top view of the lid of gas pressure regulator in FIG. 1, shown assembled with the seat.
Figure 3:
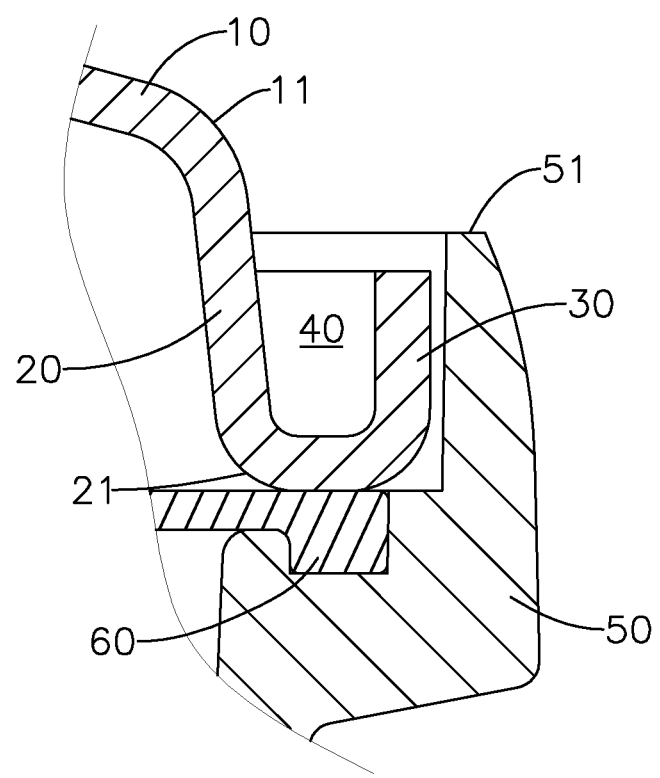
FIG. 3 is a front view in partial section of the lid of gas pressure regulator in FIG. 1, shown not assembled with the seat yet.

With reference to FIGS. 1 to 3, a lid of gas pressure regulator in accordance with the present invention comprises a top segment 10, a surrounding wall 20 and a pressing segment 30.

The top segment 10 may be designed in any shape depending on demand. In the preferred embodiment as shown in the figures, a center of the top segment 10 protrudes upward with a decreasing outer diameter and a flat top surface, but the shape of the top segment 10 are by no means limited to the abovementioned.

The surrounding wall 20 protrudes downward and annularly from an annular edge 11 of the top segment 10, and is slightly wider than the top segment 10.

The pressing segment 30 protrudes transversely, outward and annularly from a bottom edge 21 of the surrounding wall 20, and extends upward.

A gap 40 is formed between the surrounding wall 20 and the pressing segment 30.

Figure 5:
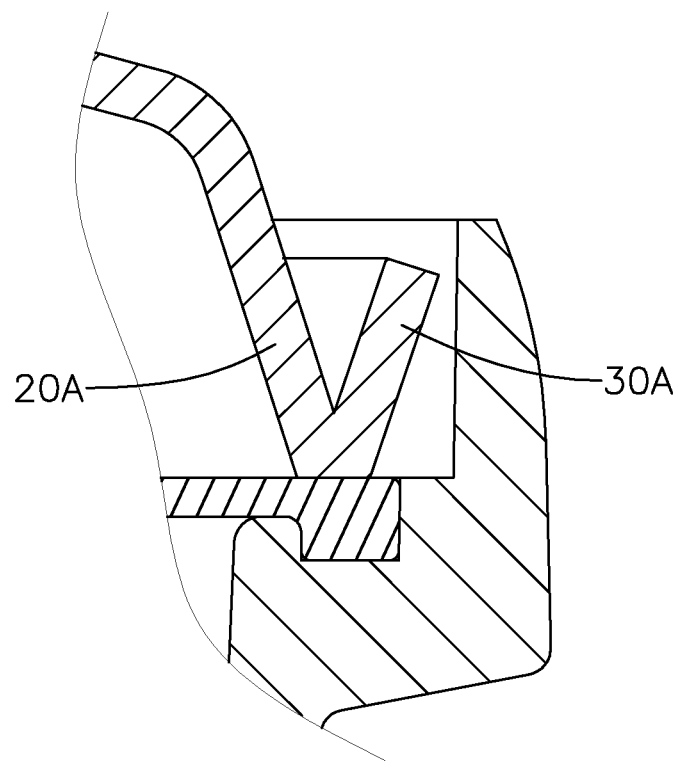
FIG. 5 is a front view in partial section of another embodiment of the lid of gas pressure regulator in FIG. 1, shown not assembled with the seat yet.
Figure 6:
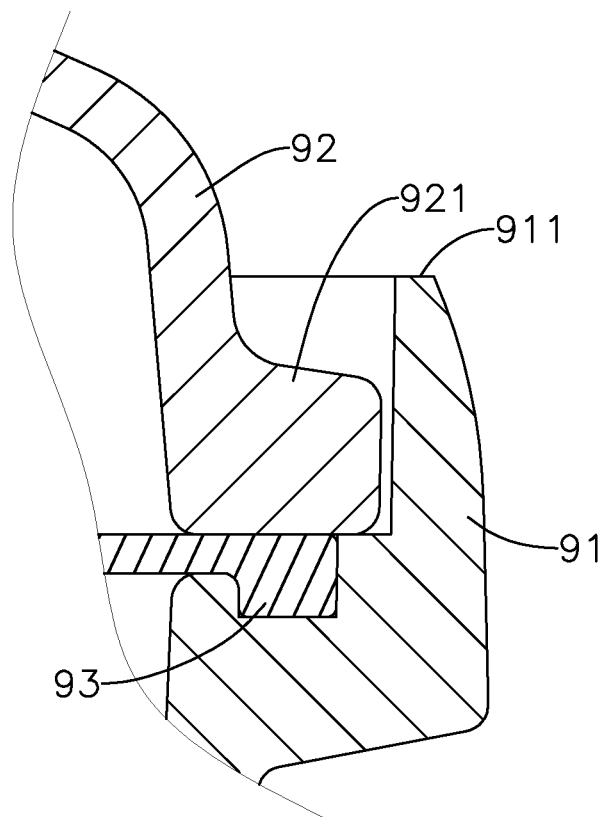
FIG. 6 is a front view in partial section of a conventional gas pressure regulator in accordance with the prior art.

In a preferred embodiment, a common vertical cross section of the surrounding wall 20 and the pressing segment 30 is preferably, but not limited to, U-shaped. In another preferred embodiment as shown in FIG. 5, the common vertical cross section of the surrounding wall 20A and the pressing segment 30A is V-shaped.

In a preferred embodiment, the top segment 10, the surrounding wall 20 and the pressing segment 30 are preferably, but not limited to, formed by stamping. The top segment 10, the surrounding wall 20 and the pressing segment 30 may be formed by other ways as long as a gap 40 is formed between the surrounding wall 20 and the pressing segment 30.

Figure 4:
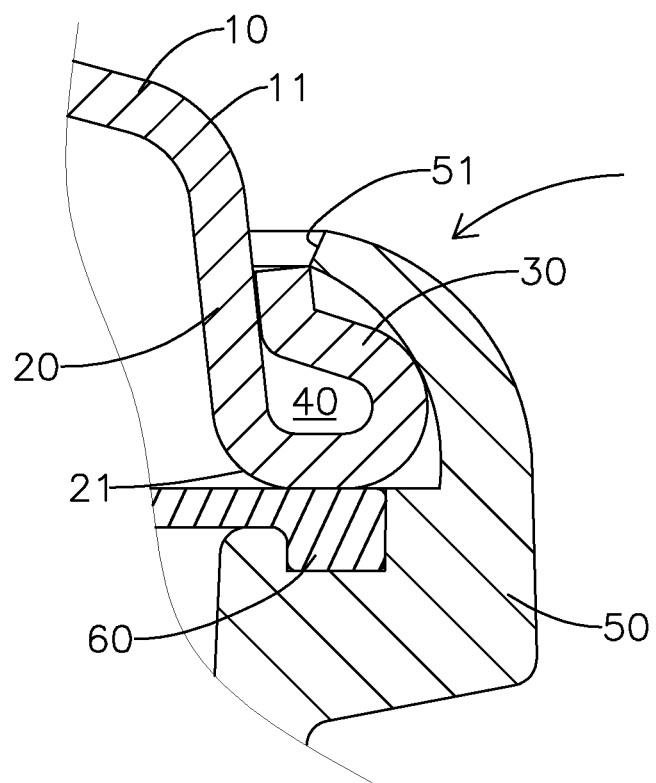
FIG. 4 is a front view in partial section of the lid of gas pressure regulator in FIG. 1, shown assembled with the seat.

With reference to FIGS. 3 and 4, when the lid as described is assembled to a seat 50, the lid is mounted inside a top opening edge 51 of the seat 50, and abuts downward the sealing washer 60. Then, the top opening edge 51 of the seat 50 is pounded inward to be bent to press the pressing segment 30 of the lid, such that the pressing segment 30 is bent through the gap 40 and toward the surrounding wall 20, leans against the surrounding wall 20, and tightly abuts downward the sealing washer 60 to securely assemble the seat 50 and the lid.

Because the top segment 10, the surrounding wall 20 and the pressing segment 30 are formed by stamping, the pressing segment 30 is thinned to form the gap 40 between the pressing segment 30 and the surrounding wall 20, thereby reducing the overall volume and the weight of the lid, and providing sufficient height of the pressing segment 30 to prevent the opening edge 51 of the seat 50 from being bent at a large angle and fracture.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lid of gas pressure regulator, the lid mounted inside a to opening edge of a seat, abutting downward a sealing washer, and comprising:
   a top segment having
      an annular edge;
   a surrounding wall protruding downward and annularly from the annular edge of the top segment, and having a bottom edge;
   a pressing segment protruding transversely, outward and annularly from the bottom edge of the surrounding wall and extending upward; and
   a gap formed between the surrounding wall and the pressing segment, wherein the top opening edge of the seat is pounded inward and bent to press the pressing segment of the lid, such that the pressing segment is bent through the gap and toward the surrounding wall, leans against the surrounding wall, and tightly abuts downward the sealing washer.

2. The lid of gas pressure regulator as claimed in claim 1, wherein a common vertical cross section of the surrounding wall and the pressing segment is U-shaped.

3. The lid of gas pressure regulator as claimed in claim 1, wherein a common vertical cross section of the surrounding wall and the pressing segment is V-shaped.

4. The lid of gas pressure regulator as claimed in claim 1, wherein the top segment, the surrounding wall and the pressing segment are formed by stamping.

5. The lid of gas pressure regulator as claimed in claim 2, wherein the top segment, the surrounding wall and the pressing segment are formed by stamping.

6. The lid of gas pressure regulator as claimed in claim 3, wherein the top segment, the surrounding wall and the pressing segment are formed by stamping.

* * * * *